Oct. 11, 1966    J. J. HAZDRA    3,278,321
COATING COMPOSITION AND GLASSWARE COATED WITH THE SAME
Filed Aug. 30, 1965
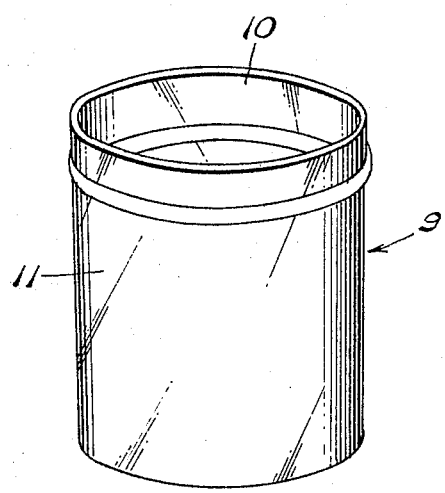
INVENTOR.
JAMES J. HAZDRA
BY
Christel & Bean
ATTORNEYS

United States Patent Office 3,278,321
Patented Oct. 11, 1966

3,278,321
COATING COMPOSITION AND GLASSWARE
COATED WITH THE SAME
James J. Hazdra, Lisle, Ill., assignor to Brockway Glass
Company, Inc., Brockway, Pa.
Filed Aug. 30, 1965, Ser. No. 483,677
11 Claims. (Cl. 106—243)

This application is a continuation-in-part of my copending application, Serial No. 160,115, filed December 18, 1961, now abandoned.

This invention generally relates to the art of protecting glassware by the provision of a coating thereon.

In particular this invention relates to a coating for glassware which renders the surface of the glassware, abrasion resistant, affords lubricity to the glassware surface over a wide temperature range, renders the surface of the glassware hydrophilic so that labels utilizing water soluble adhesives may be easily affixed thereon and is not removed when contacted with water, steam, alcohol, or alkali solutions. The protective coating is also non-toxic so the glassware may contain food products, and is non-receptive to finger marks. The protective coating further is substantially clear or transparent and does not pick up dust.

Protective coatings for glassware are now and have been utilized for some time. Many of the coatings previously used impart several of the desirable properties above listed to the surface of the glassware. For instance, polyethylene glycol and stearate soap have been utilized. These coatings provide satisfactory immediate abrasion protection and lubrication to the glassware, but they are soluble in water and therefore are easily rinsed off during the processing or use of the glassware, which renders such coatings unsatisfactory for permanent type protection.

Also utilized are coatings of the silicone type which are excellent lubricants and water repellent. The silicones, however, render the surface of the glassware hydrophobic and therefore special adhesives must be utilized to label the glassware.

Paraffin-type waves in aqueous dispersions, particularly the polyethylene waves, have also been utilized as protective coatings for glassware. The use of polyethylene coatings, however, has been found to be extremely expensive when considering the over-all cost of the glassware article. Furthermore, many of the emulsifying agents for polyethylene coatings are toxic and therefore have to be completely removed before the thus coated glassware article can be used in conjunction with food products.

It is the object of the present invention to provide an inexpensive coating for glassware which lubricates and protects the glassware surface from abrasion, and imparts a hydrophilic surface to the glassware so that conventional adhesives may be used to secure labels thereto.

It is also an object of the present invention to provide a coating for glassware which is non-toxic and may be easily applied to the surface of the ware as an aqueous dispersion.

It is also an object of the present invention to provide a permanent and inexpensive type of coating for glassware which will protect the thus coated glassware surface from abrasion.

It is also an object of the present invention to provide a permanent and inexpensive type of coating for use with glassware that lubricates the surface of the glassware thus coated.

It is also an object of this present invention to provide a permanent abrasion protection and lubricating coating for glassware which can be applied cheaply and easily and to which conventional water soluble label adhesives will adhere.

With the above and other objects in view, as will appear hereinafter, the nature of the invention will be more clearly understood by reference to the following detailed description and the accompanying drawing.

In the drawing:

The figure is a perspective view of an article of glassware having the protective coating of the present invention applied thereto.

Referring to the figure, a representative piece of glassware such as tumbler 10 is therein shown. The tumbler 10 has a coating 11 of the present invention thereon. The composite article or coated tumbler has been represented by the reference numeral 9.

A coating for glassware utilizing, as its principal insoluble lubricant, an acetylated glyceride has been found to provide the above enumerated advantages and to have none of the undesirable features present in the prior art glassware coatings. Glycerides of this type are normally prepared commercially from hydrogenated and/or unhydrogenated lard and/or from vegetable oils. As an example of a vegetable oil monoglyceride which has been used in the present invention entirely interchangeably with glycerides prepared from lard, reference is had to a distilled acetylated monoglyceride available commercially as "Myvacet Type 9–85" which is a product of Distillation Products Industries, a division of Eastman Kodak Company. It has been found that the mono- and di-acetylated glycerides have particular use in the present invention, the tri-acetylated glyceride being too water soluble (7½ parts per 100 parts of water) for the instant application of the coating.

The acetylated monoglycerides of both animal fats and vegetable oils have been employed with particular success. These commercial compounds are normally produced by a transesterification process with triacetylated glyceride whereby some of the acetylated glycerides are removed by saponification to the alcohol (monoglyceride). The resultant products are then molecularly distilled to obtain various fractions of acetylated monoglyceride, containing various amounts of the monoglyceride. The melting point of these compounds is normally directly correlated to the amount of monoglyceride present.

As the acetylated glycerides are esters and will hydrolyze with equeous solutions of alkalies and acids, an emulsification agent is necessary so that the acetylated glyceride can be applied to the surface of the glassware as an aqueous dispersion. It has been found that polyphosphate salts will produce the desired results. These water soluble alkali metal salts, such as the potassium and sodium polyphosphates, not only act to aid in the suspension of the acetylated glyceride in water but further impart a hydrophilic surface to the glassware and act as shortening agents for the principal acetylated glyceride film. A small amount of any FDA approved dispersing, wetting or emulsifying agent can also be included to assist in suspending and stabilizing the acetylated glyceride in the water and also to aid in the immediate lubricating qualities of the film. Nonionic surface active agents such as octylphenol-6-polyoxyethylene and polyoxyethylates sorbitan monooleate may be used.

A suitable emulsion is formed by dispersing the acetylated glyceride and the polyphosphate shortening agent in water with the aid of the dispersing agent. Concentrated emulsions of 25 to 50% solids content are possible; the upper limit being the solubility of the phosphate shortening agent in water. For practical considerations in the use of spray equipment, emulsions in the 0.05 to 5% range have been found most desirable.

The dispersion or emulsion is then applied to the surface of the glassware through the use of conventional spray equipment. The glassware and/or the coating emulsion may be heated. Heating of the emulsion and/or the glassware produces a firmer and more flexible insoluble film as applied to the glassware. The thus coated glassware is allowed to dry, either at room temperature or with the aid of heat, to form the thin, flexible, and insoluble protective coating of this invention.

As it is apparent from the foregoing description, an improved material is provided which is suitable for use as a protective glassware film and which may be easily and readily applied to the surface of glassware through the spray application of a water emulsion thereof. The film thus formed is clear, thin and flexible as well as tenaciously adhering to the surface of the glass. This film further leaves the surface of the glassware hydrophilic and thereby enables conventional water soluble adhesive to be utilized in the attachment of labels to the glassware. The film does not collect dust and is resistant to finger marks. It also imparts the permanent-type abrasion protection desired and immediately and permanently imparts a lubricating coating to the glassware.

The following are typical examples for carrying out the invention:

*Example I*

| | Pounds |
|---|---|
| Acetylated monoglyceride (commercial) | 20 |
| Tetrasodium pyrophosphate (anhydrous) | 6 |
| Octylphenol-6-polyoxyethylene | 1 |

The above formulation was dispersed in 81 pounds of water at room temperature to form a 25% active ingredient emulsion. This stock solution was then diluted with 91.6 parts of water for each part of the stock solution and the thus diluted emulsion was applied both as a fine spray or fog as well as during the rinse cycle of a commercial bottle washer so as to form a thin coating on the glassware. The suspension is applied to the glassware contained 0.2% acetylated glyceride, 0.06% anhydrous tetrasodium pyrophosphate, and 0.01 octophenol-6-polyoxyethylene and had a pH of 8. The coated glassware was dried at room temperature for 1½ hours. The thus treated glassware was tested and found to be satisfactory in all respects.

*Example II*

| | Pounds |
|---|---|
| Acetylated monoglyceride (commercial) | 74 |
| Sodium pyrophosphate (monohydrate) | 22.25 |
| Polyoxyethylates sorbitan monooleate | 3.75 |

The above formulation was dispersed in enough water to form a 5% active ingredient emulsion. The thus prepared emulsion was applied to glassware heated to 75 degree C. in the form of a fine spray or fog. The thus treated bottles were dried in an oven at 90 degrees C. for ½ hour. Tests carried out upon the thus treated glassware showed the glassware to be satisfactory in all respects.

The relative amounts of the active materials of the water emulsion were varied with the results shown in the following Table I.

| Acetylated monoglyceride | 50% min. | 79% max. |
|---|---|---|
| Sodium pyrophosphate | 40% max. | 20% min. |
| Polyoxyethylates sorbitan monooleate | 10% max. | 1% min. |
| | 100% | 100% |

It was found that the use of more than 40% of the sodium pyrophosphate resulted in a film of undesirable whitish characteristics and that less than 20% thereof was not adequate to produce the desired over-all hydrophilic coating.

It is obvious that the specific examples are not restrictive, and that the invention may be practiced in other ways within the scope of the appended claims.

What is claimed is:

1. A composition of matter for coating application to an article of glass ware consisting essentially of acetylated glyceride selected from the group consisting of mono- and di-glycerides in an amount of from 50 to 79 weight percent of said composition, said acetylated glyceride being obtained by the acetylation of an oil of the group consisting of animal and vegetable oils, and a water soluble polyphosphate alkali metal salt in an amount of from 20 to 40 weight percent of said composition.

2. A composition of matter for coating application to an article of glassware consisting essentially of a water dispersion of 50–79 percent acetylated monoglyceride, said acetylated monoglyceride being obtained by the acetylation of an oil of the group consisting of animal and vegetable oils, 20–40 percent of a water soluble polyphosphate alkali metal salt and 1–10 percent of a nonionic surface active agent.

3. A composition of matter for coating application to an article of glassware consisting essentially of a 0.1–5 percent active ingredient water dispersion of 50–79 percent acetylated monoglyceride, said acetylated monoglyceride being obtained by the acetylation of an oil of the group consisting of animal and vegetable oils, 20–40 percent of a water soluble polyphosphate alkali metal salt and 1–10 percent of a nonionic surface active agent.

4. A composition of matter for coating application to glassware consisting essentially of a water dispersion of 50 to 79 percent of an acetylated glyceride selected from the class of mono- and di-acetylated glycerides, said acetylated glyceride being obtained by the acetylation of an oil of the group consisting of animal and vegetable oils, and 20 to 40 percent of a water soluble polyphosphate alkali metal salt.

5. A coating consisting essentially of 50 to 79 percent of an acetylated glyceride selected from the group consisting of mono- and di-acetylated glycerides, said acetylated glyceride being obtained by the acetylation of an oil of the group consisting of animal and vegetable oils, 20 to 40 percent of a polyphosphate salt selected from the group consisting of sodium and potassium polyphosphates, and 1 to 10 percent of a nonionic suspension agent selected from the group consisting of octylphenol-6-polyoxyethylene and polyoxyethylates sorbitan monooleate.

6. A composition of matter for coating application to glassware consisting essentially of a 0.05 to 50 percent solids water dispersion of 50 to 79 percent of an acetylated glyceride selected from the group consisting of mono- and di-acetylated glycerides, and acetylated glyceride being obtained by the acetylation of an oil of the group consisting of animal and vegetable oils, 20 to 40 percent of a polyphosphate salt selected from the group consisting of sodium and potassium polyphosphates, and 1 to 10 percent of a nonionic suspension agent selected from the group consisting of octylphenol-6-polyoxyethylene and polyoxyethylates sorbitan monooleate.

7. An article of glass having a coating consisting essentially of 74 percent acetylated monoglyceride, said acetylated monoglyceride being obtained by the acetylation of an oil of the group consisting of animal and vegetable oils, 22.25 percent tetrasodium polyphosphate and 3.75 percent of a nonionic surface active agent, said percentages measured on the basis of the total weight of said monoglyceride, said polyphosphate, and said surface active agent.

8. An article of glassware having a coating consisting essentially of 50 to 79 percent of an acetylated glyceride selected from the group consisting of mono- and di-acetylated glycerides, said acetylated glyceride being obtained by the acetylation of an oil of the group consisting of animal and vegetable oils, and 20 to 40 percent of a water soluble polyphosphate alkali metal salt.

9. The article of claim 8 wherein the acetylated glyceride is acetylated monoglyceride.

10. The article of glassware as in claim 8 in which said coating includes 1 to 10 percent of a nonionic surface active agent.

11. An article of glassware having a coating consisting essentially of 50 to 79 percent of an acetylated glyceride selected from the group consisting of mono- and di-acetylated glycerides, said acetylated glyceride being obtained by the acetylation of an oil of the group consisting of animal and vegetable oils, 20 to 40 percent of a polyphosphate salt selected from the group consisting of sodium and potassium polyphosphates, and 1 to 10 percent of a nonionic suspension agent selected from the group consisting of octylphenol-6-polyoxyethylene and polyoxyethylates sorbitan monooleate.

References Cited by the Examiner
UNITED STATES PATENTS

| | | | |
|---|---|---|---|
| 2,813,045 | 11/1957 | Abbott | 117—124 |
| 2,982,660 | 5/1961 | Brissey et al. | 99—166 |
| 2,982,672 | 5/1961 | Santelli | 117—124 |

ALEXANDER H. BRODMERKEL, *Primary Examiner.*

J. B. EVANS, *Assistant Examiner.*